United States Patent [19]

Kataoka et al.

[11] Patent Number: 5,157,300
[45] Date of Patent: Oct. 20, 1992

[54] VIBRATION WAVE DRIVEN MOTOR APPARATUS

[75] Inventors: Kenichi Kataoka, Yokohama; Koji Kitani, Kawasaki, both of Japan

[73] Assignee: Canon Kabushiki Kaisha, Tokyo, Japan

[21] Appl. No.: 637,708

[22] Filed: Jan. 7, 1991

[30] Foreign Application Priority Data

Jan. 10, 1990 [JP] Japan ................. 2-2989

[51] Int. Cl.$^5$ ........................... H01L 41/08
[52] U.S. Cl. .................... 310/323; 310/51; 310/316
[58] Field of Search ............... 310/321–324, 310/316, 317, 328, 51, 116, 118

[56] References Cited

U.S. PATENT DOCUMENTS

| 4,743,788 | 5/1988 | Takagi et al. | 310/316 |
| 4,914,337 | 4/1990 | Takagi | 310/316 |
| 5,004,964 | 4/1991 | Katoaka et al. | 310/51 X |
| 5,032,753 | 7/1991 | Yamaguchi et al. | 310/317 |

FOREIGN PATENT DOCUMENTS

0261810 8/1987 European Pat. Off. .

Primary Examiner—Mark O. Budd
Attorney, Agent, or Firm—Fitzpatrick, Cella, Harper & Scinto

[57] ABSTRACT

This specification discloses a vibration wave driven motor in which frequency signals differing in phase from each other are applied to an electro-mechanical energy conversion element on a vibration member to thereby form a travelling vibration wave and a movable member is driven by the travelling vibration wave. The value of a factor which determines the natural frequency of the resonance system of the motor including a driven member when the driven member is driven by the motor or the frequency of wow-flutter is set so that the frequency of wow-flutter may not coincide with the natural frequency, thereby minimizing the unnecessary vibration of the driven member.

16 Claims, 9 Drawing Sheets

VIBRATION WAVE DRIVEN MOTOR APPARATUS

BACKGROUND OF THE INVENTION

1. Field of the Invention

This invention relates to a vibration wave driven type motor apparatus for effecting various kinds of highly accurate constant speed feeding, positioning, etc. with a vibration wave driven motor as a drive source.

2. Related Background Art

A vibration wave driven type motor is such that a vibration member in which a travelling vibration wave is formed and a member, for example, a rotor, which is in pressure contact with the vibration member are frictionally driven by the travelling vibration wave and moved relative to each other. The motor has the characteristic that stable rotation is obtained in a low speed, and also has the feature that because the vibration member and the driver held in a pressed state, the relative movement thereof is stopped as soon as the supply of driving electric power to the vibration member is cut off. Therefore, it has been proposed to use a vibration wave driven type motor as a drive source for an apparatus which requires highly accurate drive control, such as a paper feeding mechanism in a printer or a driving mechanism for the printing head of a printer. Also, in a camera, a vibration wave driven type motor is used for driving a focusing lens.

On the other hand, the vibration wave driven type motor, as is known, is designed such that a metallic elastic member formed, for example, into a ring shape and having a piezo-electric element adhesively secured thereto is used as a vibration member and an AC voltage is applied to two groups of driving phases in the piezo-electric element, whereby a travelling vibration wave (wavelength λ) is formed in the elastic member by the combination of standing waves which are 90° out of phase with each other, and the two groups of driving phases are provided at locations positionally deviating from each other by odd number times $\frac{1}{4}\lambda$, and the AC voltage applied to these driving phases has a time phase of 90°.

On the other hand, a member urged against the elastic member of the vibration member is frictionally driven by a travelling vibration wave formed in the elastic member and, therefore, is adapted to be urged against the elastic member with a friction member interposed therebetween.

In order to obtain highly accurate relative movement, the portion of contact between the elastic member and the friction member is formed into a surface having a highly accurate flatness, and the squareness of the surface of the portion of contact to the rotary shaft of the motor is formed with high accuracy so that there may be no irregularity of surface pressure.

However, a high-degree machining technique and a long machining time are required to finish the contact surface of the elastic member and the friction member of the vibration wave driven motor into a highly accurate flat surface, and this leads to a high cost.

So, if an attempt is made to shorten the machining time and reduce the cost, the degree of flatness will become bad. In particularly in lapping work, an increase in pressure force for the purpose of shortening the time would tend to cause a so-called two-bend phenomenon in which the degree of flatness of the elastic member and the friction member is bent into two, and this may result in irregular surface pressure during relative movement, which in turn may cause irregular rotation.

Also, the irregular surface pressure increases the influence of the phenomenon that the amplitude of the travelling vibration wave fluctuates depending on the eccentricity of a slit formed in the elastic member, the eccentricity of the rotor and the irregularity of the travelling vibration wave, i.e., at what location on the elastic member the antinode of the travelling vibration wave lies, and each portion driver by the vibration wave driven motor vibrates. Thus control has become difficult in some cases.

SUMMARY OF THE INVENTION

One aspect of the application is to provide a vibration wave driven motor in which vibration of the driven portions by the influence of an irregular pressure surface or the like, is prevented factors which determine the natural frequency of a motor apparatus including the driven portions and the frequency of wow-flutter are set so that said frequencies may not coincide with or approximate each other.

One aspect of the application is to provide a vibration wave driven motor apparatus which uses as a drive source a vibration wave driven motor in which AC voltages differing in phase in terms of time are applied to the plurality of driving phases of an electro-mechanical energy conversion element secured to an elastic vibration member made of an elastic material to thereby excite a plurality of standing waves and by the combination of these standing waves, a travelling vibration wave is formed in the elastic vibration member, whereby the elastic vibration member and a member urged against the elastic vibration member are moved relative to each other and wherein one or more driven members are driven by the vibration wave driven motor and wherein at least one of one or more natural frequencies of one or more resonance systems constituted by one or more driven members and a transmission driving system therefor and the driving speed is set so that at least a frequency of $A=1$ among the frequency components of wow-flutter obtained by 2·A·N of the vibration wave driven motor and at least one of such one or more natural frequencies may not coincide with or approximate each other.

Other objects of the present invention will become more apparent from the following detailed description of some embodiments of the invention taken in conjunction with the accompanying drawings.

DESCRIPTION OF THE PREFERRED EMBODIMENTS

Embodiment 1

Figure 1:
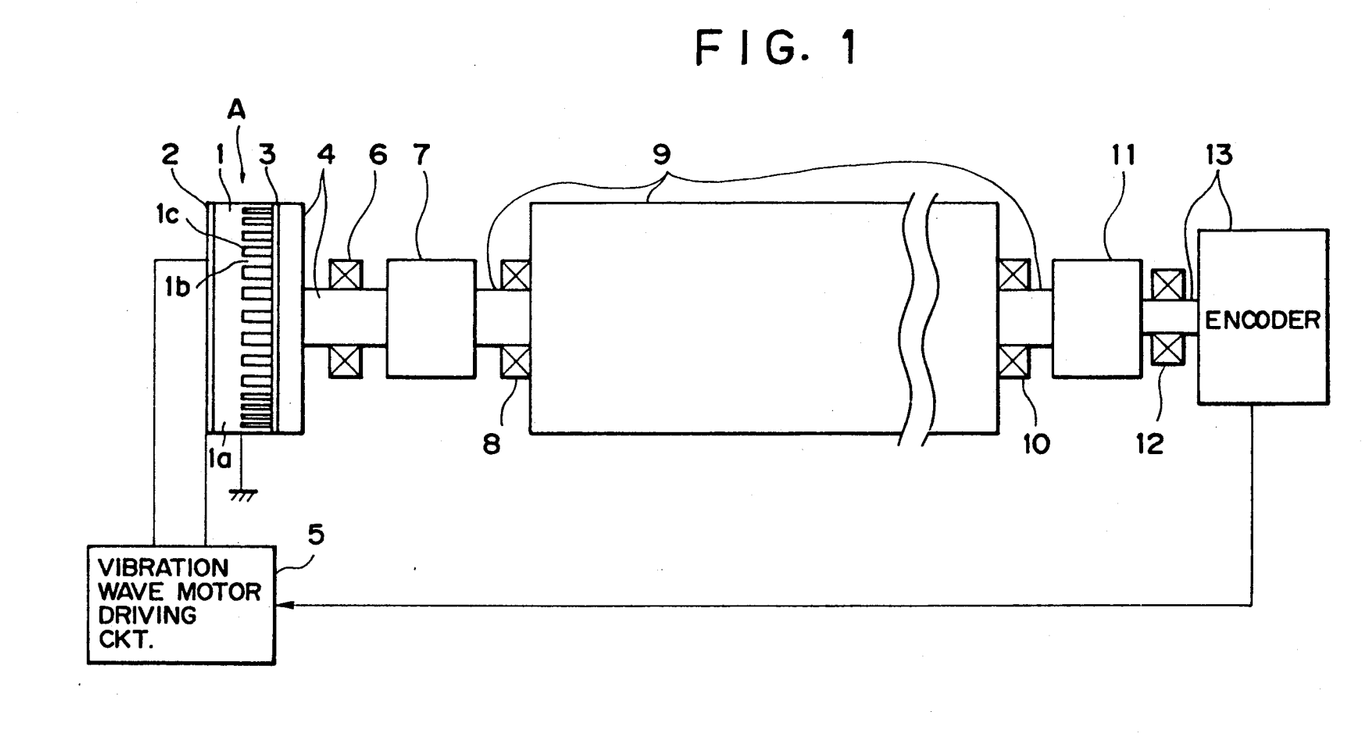
FIG. 1 shows Embodiment 1 of a vibration wave driven motor apparatus according to the present invention which is used in a sheet drive mechanism.

FIG. 1 shows Embodiment 1 of a vibration wave driven motor apparatus according to the present invention.

This embodiment is such that a sheet drive roller 9 is rotatively driven under feedback control by a circular ring type vibration wave driven motor A. The vibration wave driven motor A and the roller 9 are connected together by a first coupling 7 having a spring structure, and the roller 9 and an encoder 13 are connected together by a second coupling 11 having a spring structure. The rotated state of the roller 9 is detected by the encoder 13, and on the basis of the detection signal, a vibration wave motor driving circuit 5 drives the vibration wave driven motor A at a predetermined number of revolutions.

The vibration wave driven motor A is such that a rotor 4 is urged against a circular ring-shaped vibration member 1 in which a travelling vibration wave is formed with a friction member 3 interposed therebetween, and the friction member 3 integral with the rotor 4 is frictionally driven by the travelling vibration wave formed in the vibration member 1, whereby the rotor 4 is rotatively driven in a predetermined direction. The vibration member 1 comprises a circular ring-shaped elastic member 1a formed of a metallic material and a piezo-electric element 3 including a group of driving piezo-electric elements or the like and adhesively secured to one end surface side (the surface side opposite to the driving surface) of the elastic member 1a, and a plurality of slits 1c are formed in the driving surface side of the elastic member 1a along the circumferential direction thereof to lower the neutral axis of vibration, and the end surfaces of projections 1b formed among the slits are urged against the friction member 3.

The reference numeral 6 designates a bearing for supporting the rotary shaft of the rotor 4, the reference numerals 8 and 10 denote bearings for supporting the rotary shaft of the roller 9, and the reference numeral 12 designates a bearing for supporting the input shaft of the encoder 13. The bearing 6 regulates eccentricity, and the axial regulation of the rotary shaft is effected by a mechanism, not shown, for urging the rotor 4 against the vibration member.

The vibration wave motor driving circuit 5 compares the set speed of the vibration wave driven motor A with the speed detected by the encoder 13, and varies the amplitude of an AC voltage applied to the group of driving piezo-electric elements of the piezo-electric element 2 of the vibration wave driven motor A so that the roller 9 may be rotated at a predetermined speed.

In the shaft system thus constructed, the shaft of the rotor 4, the first coupling 7 and the roller 9 together are defined as a first resonance system (whose natural frequency is $F_1$), and the shaft of the roller 9, the second coupling 11 and the encoder 13 together are defined as a second resonance system (whose natural frequency is $F_2$), and the natural frequencies $F_1$ and $F_2$ of these resonance systems are set so as to deviate from the frequency component $f_1$ of wow-flutter corresponding to the two-bend phenomenon of the vibration wave driven motor A, the frequency component $f_2$ of wow-flutter corresponding particularly to the number of standing waves in the irregularity of the travelling vibration wave, the frequency component $f_3$ of wow-flutter corresponding to the number of slits, the frequency component $f_4$ of wow-flutter corresponding to the eccentricity of the rotor, and the frequency component $f_5$ of the lowest-order wow-flutter corresponding to the irregularity of the travelling vibration wave.

$f_1$, $f_2$, $f_3$, $f_4$ and $f_5$ can be found from the following equations:

$$f_1 = 2 \cdot A \cdot N$$

$$f_2 = 2 \cdot A \cdot S \cdot T \cdot N$$

$$f_3 = A \cdot M \cdot N$$

$$f_4 = A \cdot N$$

$$f_5 = 2 \cdot A \cdot S \cdot N$$

where A is an integer (1, 2, 3, . . . ), N is the number of revolutions (rpS), S is the wave number of the travelling vibration wave, T is the number of standing waves combined together, and M is the number of slits or projections.

Here, when the number of revolutions (N) of the vibration wave driven motor is 100 (rpm) and the wave number (S) of the travelling vibration wave is 8 and the number ($\mu$) of slits is 90 and A=1, the above-mentioned frequency components $f_1$, $f_2$, $f_3$, $f_4$ and $f_5$ are: $f_1$=3.3 (Hz), $f_2$=53.3 (Hz), $f_3$=150 (Hz), $f_4$=1.7 (Hz) and $f_5$=26.7 (Hz).

Thus, the natural frequency $F_1$ of the first resonance system and the natural frequency $F_2$ of the second resonance system can be designed to avoid these frequency components $f_1$, $f_2$, $f_3$, $f_4$ and $f_5$.

When the composite torsional stiffness of the shaft in the first resonance system is $K_1$ and the moment of inertia of the roller 9 is $J_1$ and the torsional stiffness of the shaft in the second resonance system is $K_2$ and the moment of inertia of the encoder 13 is $J_2$ and if the moment of inertia $J_1$ is very great relative to the moment of inertia $J_2$ and the stiffness $K_1$ is very great relative to the stiffness $K_2$, $$F_1 = \frac{1}{2\pi} \sqrt{\frac{K_1}{J_1}}, F_2 = \frac{1}{2\pi} \sqrt{\frac{K_1}{J_2}}$$

Actually, the moment inertias of the roller 9 and the encoder 13 are first substantially determined and therefore, the torsional stiffness of the coupling 7 and the coupling 11 or the shaft of the rotor 4, the shaft of the roller 9 and the shaft of the encoder 13 are set with the environment temperature, load torque, etc. during use taken into account so that $F_1$ and $F_2$ may avoid 1.7 [Hz], 3.3 [Hz], 26.7 [Hz], 53.3 [Hz] and 150 [Hz]. Also, when mechanical change is inevitably difficult, the number of slits in the vibration member 1 or the wave number of the travelling vibration wave may be changed. Also, if permitted, it is effective to change the number of revolutions. Where the present invention cannot be carried out or where further attenuation must be done, torsional vibration can be attenuated by the use of a damper utilizing the viscosity of liquid or gas or the viscoelasticity of rubber or the like, or a damper utilizing the attenuation by friction or magnetic force.

Also, it is known that where control is effected by the use of a digital sensor such as an encoder, there occurs the wow-flutter of the frequency of a signal fed back from the encoder, but if there is a problem during use, it is a matter of course to prevent this frequency and the natural frequencies of the resonance systems from coinciding with or approximating each other.

Also, where use is made of such control that wow-flutter is positively created as driving by a burst signal, it is a matter of course to prevent the frequency of the wow-flutter and the natural frequencies of the resonance systems from coinciding with or approximating each other.

Also, if there hardly arises a problem when the natural frequencies of the resonance systems are actually used, it is a matter of course that the natural frequencies may be made to coincide with or approximate the frequency of wow-flutter.

The foregoing description is of the construction of the side driven by the motor A, and the same thing also holds true of the interior of the motor A.

In the above-described embodiment, it has been stated that $F_1$ and $F_2$ avoid 1.7 [Hz], 3.3 [Hz], 53.3 [Hz] and 150 [Hz], but in the case of such low degrees of frequencies, design is usually made such that the rigidity of the couplings and shafts is increased and $F_1$ and $F_2$ are made into frequencies sufficiently higher than 150 [Hz] and $f_1$, $f_2$, $f_3$ and $f_4$ when A is equal to or greater than 2 are avoided or attenuated.

Embodiment 2

Figure 2:
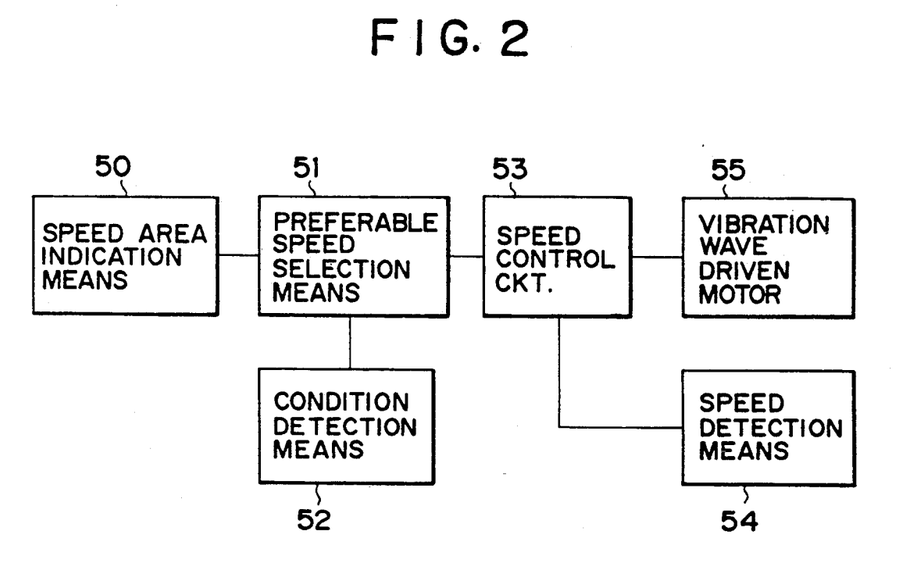
FIG. 2 is a block diagram of Embodiment 2 of the vibration wave driven motor apparatus for automatically controlling a vibration wave driven motor at an optimum speed in conformity with situation.

FIG. 2 is a block diagram of a vibration wave driven motor apparatus which controls a vibration wave driven motor so that the motor may rotate at a preferable speed in conformity with situation when that speed is indicated.

When a preferable speed is indicated to preferable speed selection means 51 by speed area indication means 50, the preferable speed selection means 51 selects the preferable speed as by the technique of fuzzy control by the use of various parameters detected by condition detection means 52 or a data table of the readily controllable rotational speed of the vibration wave driven motor, and puts out a speed command to a speed control circuit 53. The speed control circuit 53 compares the speed command with the rotational speed of the vibration wave driven motor 55 detected by speed detection means 54, and controls the rotational speed of the vibration wave driven motor 55 so as to become equal to the speed command. It is to be understood that a mechanism provided with the construction shown in FIG. 1 is driven by the motor of FIG. 2.

Figure 3:
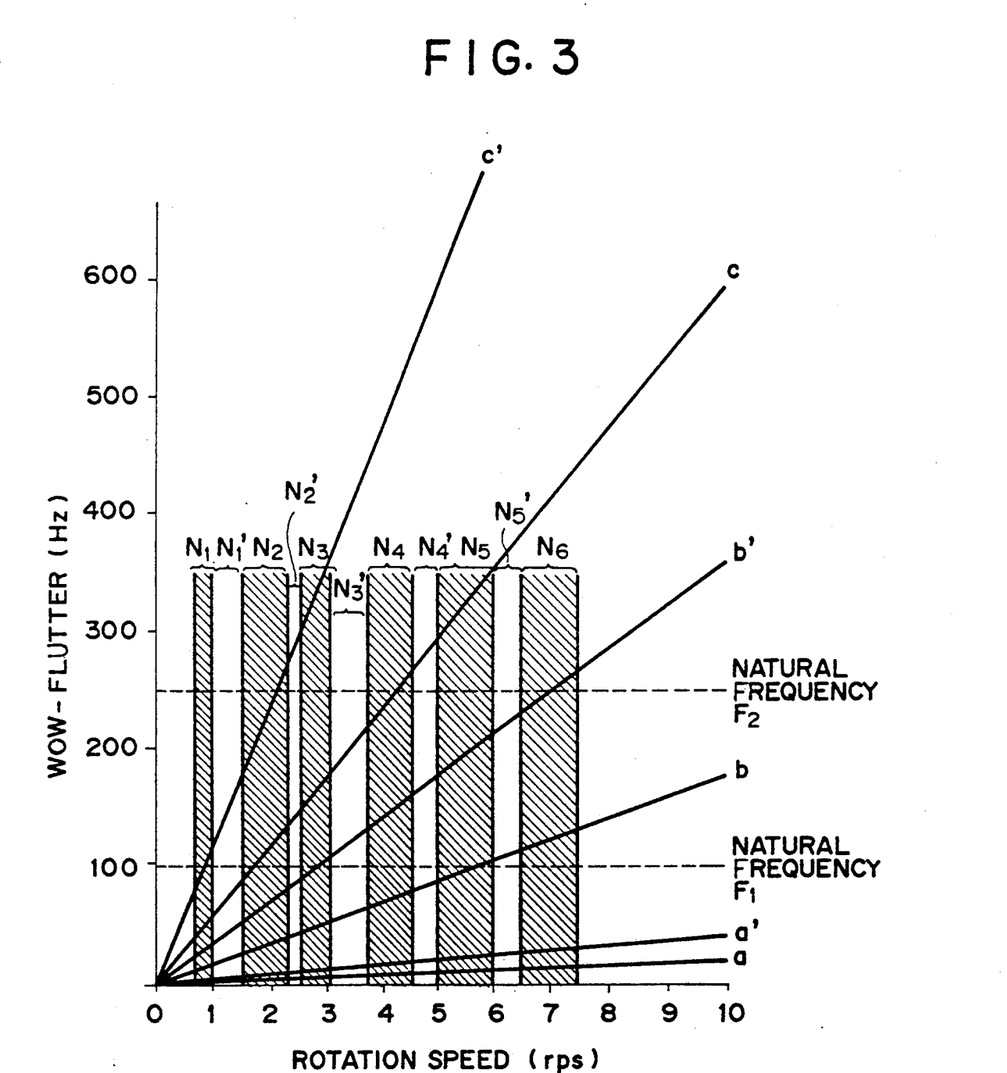
FIG. 3 shows an example of the optimum speed area of the vibration wave motor.

FIG. 3 shows the area of the vibration wave driven motor which is readily speed-controllable. In the figure, a is the relation between the frequency of wow-flutter caused by the two bends of the vibration member 1 and the rotational speed, and a' is twice the inclination of a and is the higher harmonic of the wow-flutter indicated by a.

b is the relation between the frequency of wow-flutter caused by the irregularity of the amplitude of the travelling vibration wave and the two bends of the vibration member when a travelling vibration wave of nine waves is created by the combination of two standing waves and the rotational speed, and b' is twice the inclination of b and is the higher harmonic of the wow-flutter indicated by b.

c is the relation among sixty equally spaced apart slits formed in the vibration member and the frequency of wow-flutter caused by the two bends of the vibration member and the rotational speed, and c' is twice the inclination of c and is the higher harmonic of the wow-flutter indicated by c.

The portions indicated by hatching in FIG. 3 indicate the areas of the rotational speed in which the natural frequencies $F_1$ and $F_2$ of the first and second resonance systems shown in FIG. 1 approximate to the frequency of wow-flutter, and if these areas are deviated from, control will become relatively easy and wow-flutter will decrease.

That is, if the vibration wave driven motor is rotated at the rotational speed in the portions indicated by hatching in FIG. 3, the natural frequency $F_1$ or $F_2$ and the frequency of wow-flutter substantially coincide with each other and therefore, if the motor is driven at any other rotational speed than the rotational speed in the portions indicated by hatching, vibration can be decreased.

The selection means 51 of FIG. 2 detects the number of revolutions N set by the indication means 50, and determines whether this N is within the ranges of number of revolutions $N_1$, $N_2$, $N_3$, $N_4$, $N_5$ and $N_6$ in the portions indicated by hatching in FIG. 3, and if the set number of revolutions N is outside these ranges, the set number of revolutions N is transmitted to the control circuit 53, which thus controls the number of revolutions of the motor so as to become N. On the other hand, when the set number of revolutions N is within there ranges, the number of revolutions in one of the ranges of number of revolutions $N_1'$, $N_2'$, $N_3'$, $N_4'$ and $N_5'$ shown in FIG. 3 which is most approximate to the set number of revolutions N is transmitted as the output of the selection means 51 to the control circuit 53 to thereby control the number of revolutions of the motor. Thereby the vibration by wow-flutter can be decreased.

In an apparatus for driving a machine used for various uses or a machine selected from among various machines used for respective different uses by a motor selected by selection means for selecting a motor from among various motors, vibration wave driven motors in which not only the sizes of vibration members and the depths of slits formed on the vibration members are made various but also the number of slits and the wave numbers of travelling vibration waves are made various are prepared and from among them, a motor which is best in wow-flutter characteristic is selected on the basis of the natural frequency of the machine and the data of rotational speed, whereby a vibration wave driven motor having a good wow-flutter performance can be constructed.

Embodiment 3

Figure 4A:
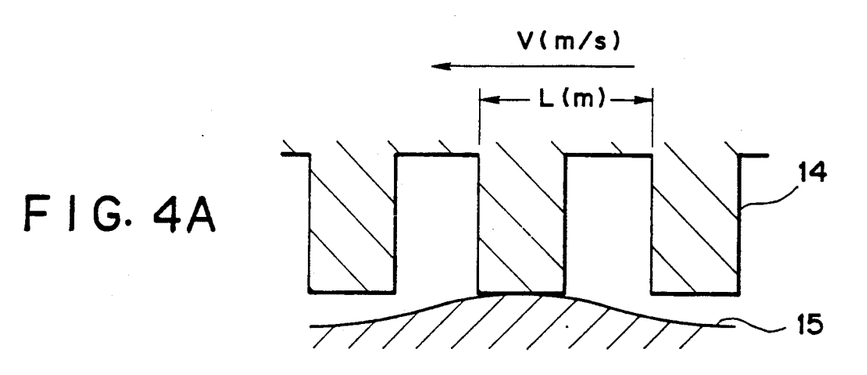
FIGS. 4A and 4B are side views of the portion of contact between the slit structure and the friction member of a linear type vibration wave driven motor.
Figure 4B:
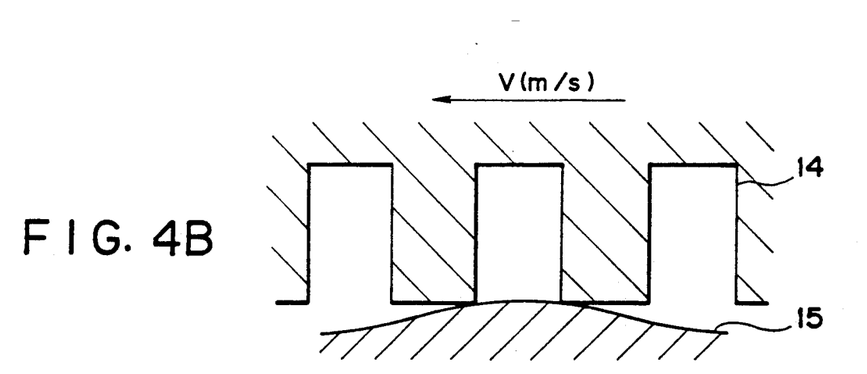
Figure 5A:
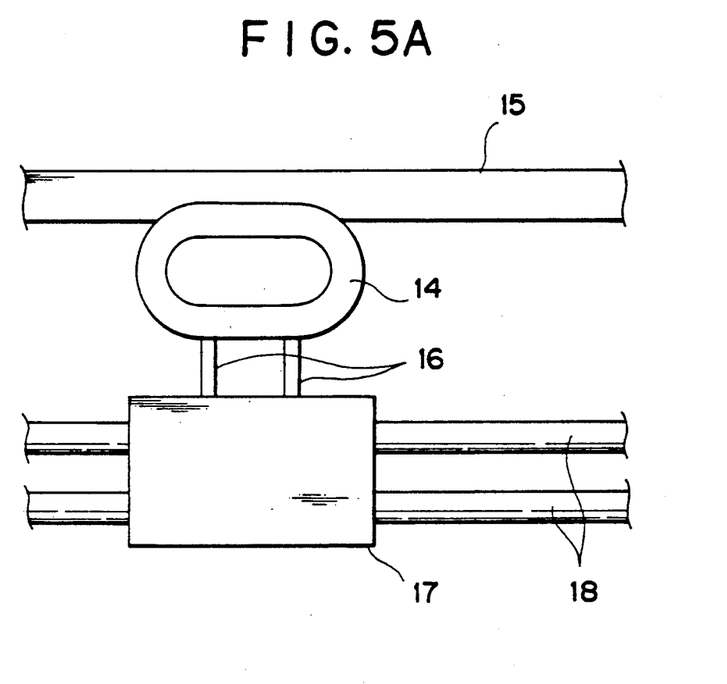
FIGS. 5A and 5B are a plan view and a side view, respectively, showing Embodiment 3 of the linear type vibration wave driven motor.
Figure 5B:
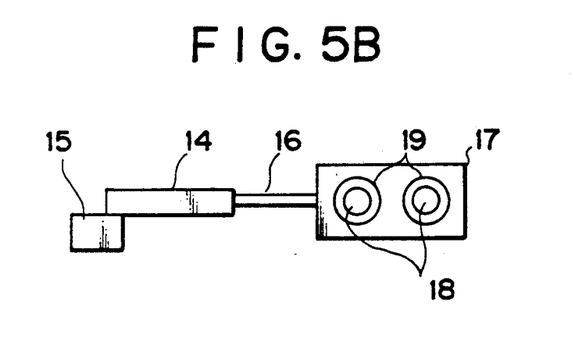

In a vibration wave driven linear motor apparatus wherein the slit or projection structure of a vibration member and a friction member are brought into pressure contact with each other and the vibration member and the friction member are moved relative to each other with the portion of contact therebetween as a boundary, when as shown in FIG. 4, a vibration member 14 having slit structure on an elastic member is moving on an obstruction such as a flaw on a friction member 15 at a relative speed V [m/s], a projected portion comes to the top of the obstruction as shown in FIG. 4A, whereafter a grooved portion comes to the top of the obstruction as shown in FIG. 4B, and if this is repeated, the pressed state of the vibration member will change and the relative speed V [m/s] will fluctuate each time the projected portion goes over the obstruction. FIG. 5 shows an embodiment of a vibration wave driven linear motor apparatus which eliminates the influence of such speed irregularity. The reference numeral 16 designates support rods for supporting the vibration member 14, the reference numeral 17 denotes a carriage to which the support rods 16 are fixed, the reference numeral 18 designates shaft bars for fixing the carriage 17, and the reference numeral 19 denotes linear bearings. Here, by setting the weight of the vibration member 14 or the rigidity of the support rods 16 or the speed V [m/s] so that the weight of the vibration member 14 and the natural frequency of a resonance system constituted by the springs of the support rods 16 may not coincide with or approximate $A \cdot V/L$ [Hz] (V being the relative speed (m/s), L being the spacing [m] between the slits or projections of the portion of contact, and A being an integer 1, 2, ... ), the wow-flutter when constant speed control is effected becomes very small.

Figure 7:
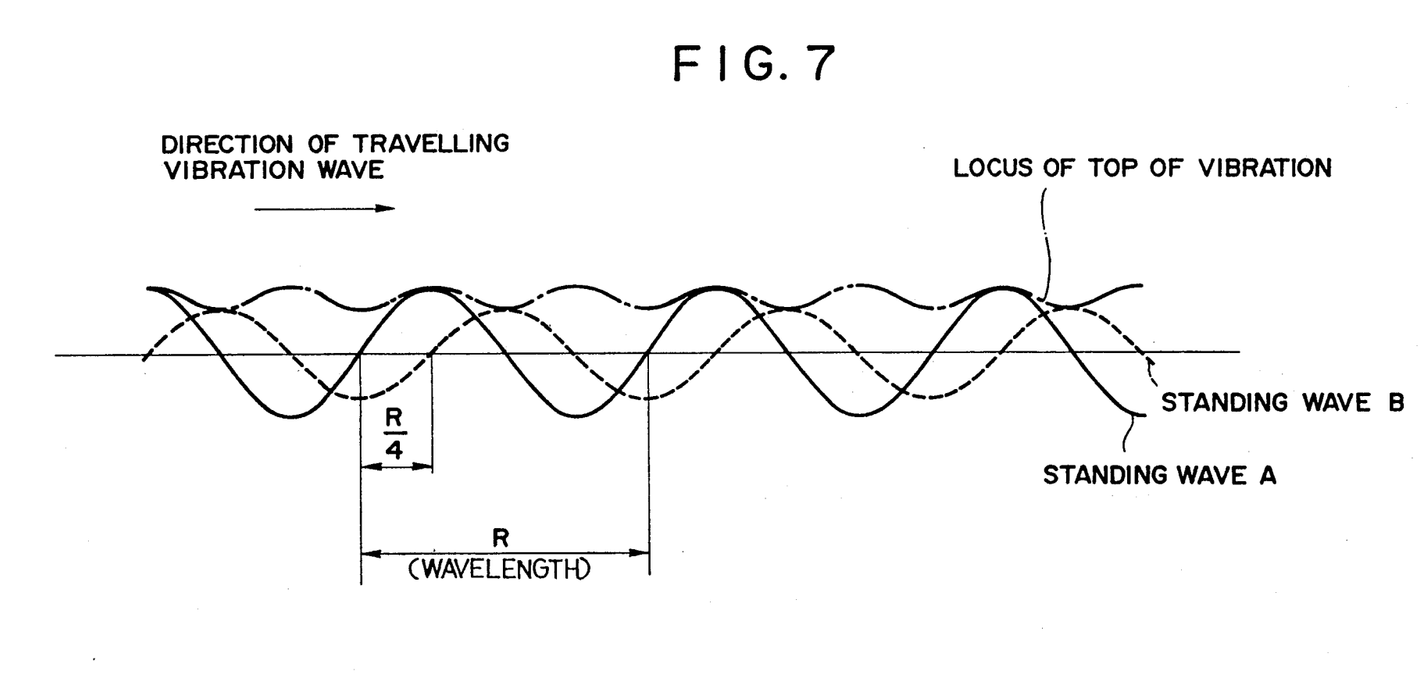
FIG. 7 shows a first example of the irregularity of a travelling vibration wave.

If in the apparatus shown in FIG. 5, there is irregularity of a travelling vibration wave, wow-flutter of another frequency will occur, and FIG. 7 shows the locus of the top of a travelling vibration wave provided by the combination of a standing wave A and a standing wave B, and the waveforms of the standing wave A and the standing wave B in FIG. 7 represent the maximum amplitudes thereof. When such standing waves differing in amplitude from each other are combined, the amplitude of the travelling vibration wave is accompanied by two-period fluctuation while the travelling vibration wave moves by one wavelength (R). Accordingly, when the vibration member 14 goes over the obstruction, two-period speed fluctuation occurs while the vibration member 14 moves by one wavelength and therefore, by setting the weight of the vibration member 14 or the rigidity of the support rods 16 or the speed V [m/s] so that the natural frequency of the resonance system may not coincide with or approximate $2 \cdot A \cdot V/R$ (V being the relative speed (m/s), R being the wavelength [m] of the standing waves, and A being an integer 1, 2, ... ), wow-flutter can be made very small.

Figure 8:
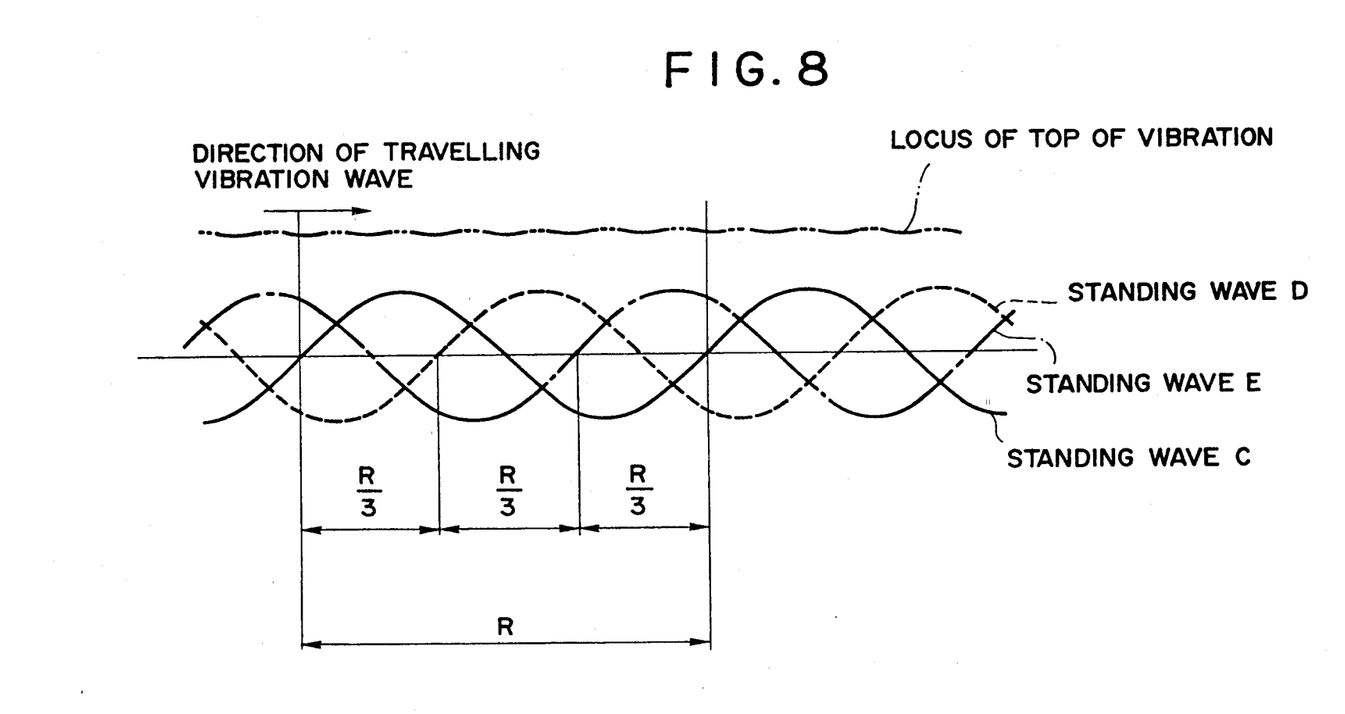
FIG. 8 shows a second example of the irregularity of the travelling vibration wave.
Figure 9:
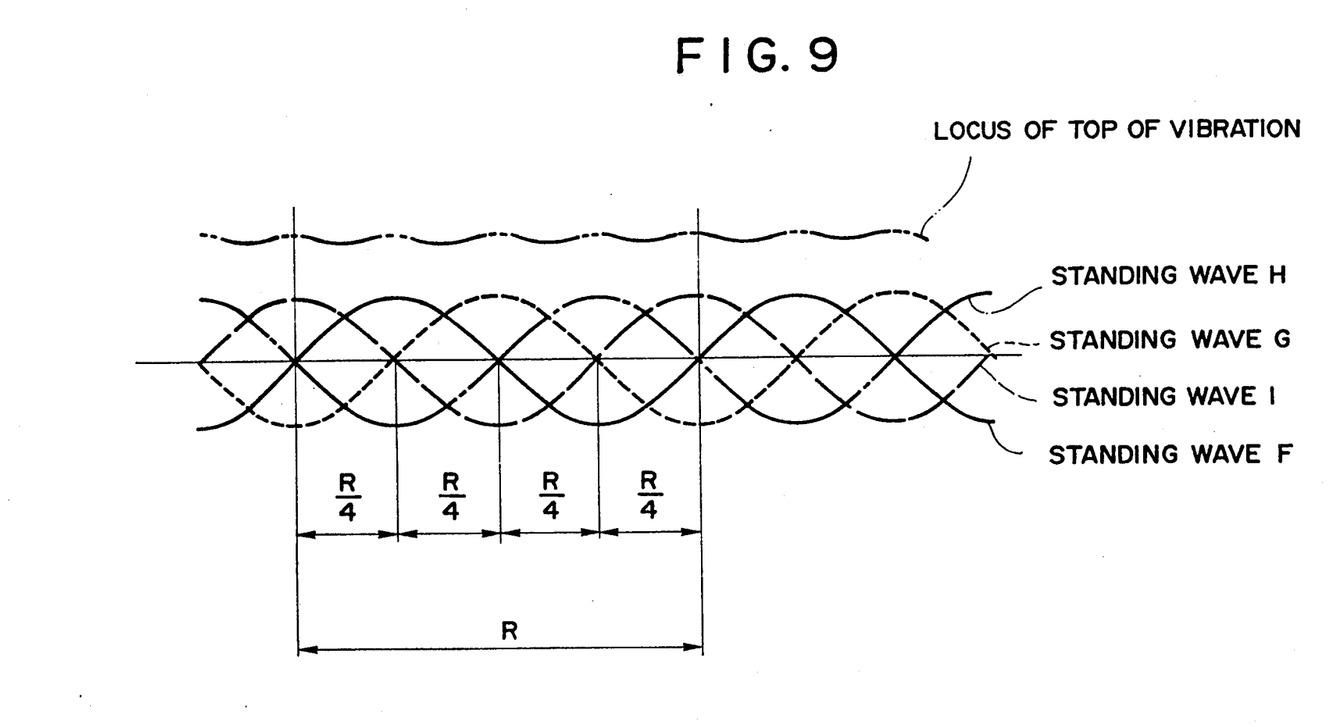
FIG. 9 shows a third example of the irregularity of the travelling vibration wave.

The irregularity of the travelling vibration wave attributable to the number of standing waves is shown in FIGS. 8 and 9. In FIG. 8, the number of standing waves is three, and in FIG. 9, the number of standing waves is four.

The waveforms of the standing waves shown represent the maximum amplitudes thereof.

As can be seen from these figures, the locus of the top of the travelling vibration wave has six-period fluctuation when the number of standing waves is three in one wavelength, and has four-period fluctuation when the number of standing waves is four in one wavelength. Accordingly, when the vibration member 14 goes over an obstruction, six-period and four-period speed fluctuations occur while the vibration member 14 moves by one wavelength and therefore, by setting the weight of the vibration member 14 or the rigidity of the support rods 16 or the speed V [m/s] so that the natural frequencies of the resonance systems may not coincide with or approximate $2 \cdot A \cdot V \cdot T/R = 6 \cdot A \cdot V/R$ when the number of standing waves is an odd number, 3, and may not coincide with or approximate $A \cdot V \cdot T/R = 4 \cdot A \cdot V/R$ (V being the relative speed (m/s), R being the wavelength [m] of the standing waves, T being the number of standing waves, and A being an integer 1, 2, ... ), wow-flutter can be made very small.

Embodiment 4

Figure 6:
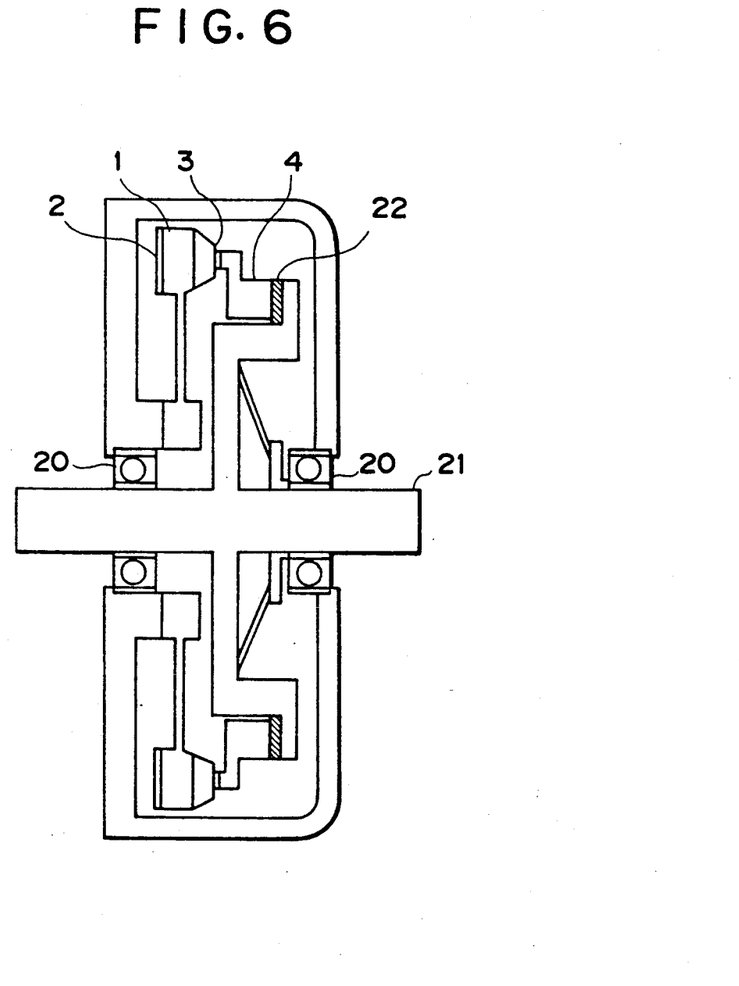
FIG. 6 shows an annular vibration wave driven motor according to Embodiment 4.

FIG. 6 shows Embodiment 4. The vibration wave driven motor suffers from one-sided contact and pressure irregularity if the degree of parallelism of the vibration member 1 and the rotor 4 is bad. However, enhancing working accuracy and assembling accuracy to provide a good degree of parallelism would lead to a higher cost as previously described and therefore, it is a popular practice to use a member 22 formed of a material of low elastic modulus such as rubber between the friction member 3 and a member for maintaining the posture (such as a shaft 21 held by bearings 20) to reduce pressure irregularity. Accordingly, a resonance system is made of the elasticity of the material of low elastic modulus (herein represented by rubber) and the extraneous moment of inertia.

Assuming for example that rubber 22 having a modulus of transverse elaticity G and a thickness t is attached with an average radius r of contact surface and a contact area S as shown in FIG. 6, torsional stiffness K is expressed as $$K = Gr^2 s/t.$$

Accordingly, the relation between the extraneous moment of inertia J and the frequency f is $$f = \frac{1}{2\pi} \sqrt{\frac{K}{J}} = \frac{r}{2\pi} \sqrt{\frac{Gs}{Jt}},$$

where f is the resonance frequency specifically calculating the resonance frequency, when a motor in which use is made of rubber having a modulus of transverse elasticity $G = 1 \times 10^6 N/m^2$, a thickness of 1 mm and $\phi 45 - \phi 35$ has an extraneous inertia of 10 kg cm$^2$, $$t = 1.0 \times 10^{-3}(m), \; r = 2.0 \times 10^{-2}(m),$$

$$S = 6.28 \times 10^{-4}(m^2), \; J = 1.0 \times 10^{-3}(kg\; m^2)$$

are substituted for the above equation to obtain $$f = \frac{2.0 \times 10^{-2}}{2\pi} \sqrt{\frac{1 \times 10^6 \times 6.28 \times 10^{-4}}{1.0 \times 10^{-3} \times 1.0 \times 10^{-3}}}$$

$$= 80 \; (Hz).$$

Also, as is apparent from the above equation, the resonance frequency f is a function of the average radius r of contact surface, the thickness t and the contact area S, and separating it from the frequency of unavoidable irregularity of rotation by the number of revolutions can be accomplished by changing the shape of the rubber.

Also, when the friction member 3 is formed of a material of low elastic modulus, the resonance frequency can be found by a similar calculation. Consequently, in the case of the motor shown in FIG. 6, it is necessary to set factors in each embodiment so that the resonance frequency f and the frequency of the wow-flutter shown in each embodiment may not coincide with each other.

We claim:

1. A motor control system for driving a driven member of a vibration wave driven motor, said motor including an elastic vibration member and an electro-mechanical energy conversion element portion provided on said elastic member and in which frequency signals differing in phase from each other are applied to thereby excite a plurality of standing waves therein, said standing waves combining to form a travelling vibration wave as a drive force, said system including:

a factor which determines a natural frequency of a resonance system including said driven member and a factor which determines a frequency of wow-flutter, said factors being set so that said natural frequency and said frequency of wow-flutter may not coincide with or approximate each other.

2. A motor control system according to claim 1, wherein said frequency of wow-flutter is found from $2 \cdot A \cdot N$, where A is an integer and N is a driving speed, and wherein N is the factor which determines said frequency of wow-flutter.

3. A motor control system according to claim 1, wherein said frequency of wow-flutter is found from $A \cdot S \cdot T \cdot N$ (where T is an even number) or $2 \cdot A \cdot S \cdot T \cdot N$ (where T is an odd number), where S is a wave number of the travelling vibration wave, T is the number of standing waves combined, and N is a driving speed, and wherein S, T or N is the factor which determines the frequency of wow-flutter.

4. A motor control system according to claim 1, wherein a surface of said elastic member is formed with substantially equally spaced-apart slits or projection, wherein said frequency of wow-flutter is found from $A \cdot M \cdot N$, where A is an integer, M is the number of slits or projections, and N is a driving speed, and wherein M or N is the factor which determines said frequency of wow-flutter.

5. A motor control system according to claim 1, wherein said frequency of wow-flutter is found from $A \cdot N$, where A is an integer and N is a driving speed, and wherein N is the factor which determines said frequency of wow-flutter.

6. A motor control system according to claim 1, wherein said frequency of wow-flutter is found from $2 \cdot A \cdot S \cdot N$, where S is a wave number of the travelling vibration wave and N is a driving speed, and wherein S or N is the factor which determines said frequency of wow-flutter.

7. A motor control system according to claim 1, wherein said frequency of wow-flutter is found from $A \cdot V \cdot T / R$ (where T is an even number) or $2 \cdot A \cdot V \cdot T / R$ (where T is an odd number), where V is a relative speed of the motor, T is the number of standing waves, and R is a wavelength of the travelling vibration wave, and wherein V, T or R is the factor which determines said frequency of wow-flutter.

8. A motor control system according to claim 1, wherein a surface of said elastic member is formed with substantially equally spaced-apart slits or projections, wherein said frequency of wow-flutter is found from $A \cdot V / L$, where V is a relative speed of the motor, and L is a spacing between the slits or projections, and wherein V or L is the factor which determines said frequency of wow-flutter.

9. A motor control system according to claim 1, wherein said frequency of wow-flutter is found from $2 \cdot A \cdot V / R$, where V is a relative speed of the motor and R is a wavelength of the travelling vibration wave, and wherein V or R is the factor which determines said frequency of wow-flutter.

10. A motor control system for driving a driven member of a vibration motor, said vibration motor including an electro-mechanical energy conversion element portion in which frequency signals differing in phases from each other are applied to produce therein a vibration as a driving force, said system comprising:

a factor which determines a natural frequency of a resonance system and a factor which determines a frequency of wow-flatter, said factors being set so that said natural frequency and said frequency of wow-flutter may not coincide with or approximate each other.

11. A motor control system according to claim 10, wherein said frequency of wow-flutter is found from $2 \cdot A \cdot N$, where A is an integer and N is a driving speed, and wherein N is the factor which determines said frequency of wow-flutter.

12. A motor control system according to claim 10, further comprising an elastic member, a surface of said elastic member being formed with substantially equally spaced-apart slits or projections, wherein said frequency of wow-flutter found from $A \cdot M \cdot N$, where A is an integer and M is a driving speed, and wherein M or N is the factor which determines said frequency of wow-flutter.

13. A motor control system according to claim 10, wherein said frequency of wow-flutter is found from $A \cdot N$, where A is an integer and N is a driving speed, and wherein N is the factor which determines said frequency of wow-flutter.

14. A motor control system according to claim 10, further comprising an elastic member, a surface of said elastic member being formed with substantially equally spaced-apart slits or projections, wherein said frequency of wow-flutter is found from $A \cdot V / L$, where A is an integer, V is a relative speed of the motor, and L is a spacing between the slits or projections, and wherein V or L is the factor which determines said frequency of wow-flutter.

15. A motor control system for a vibration motor, said system comprising:

setting means for setting motor speed; and a prohibition circuit for prohibiting the driving of the motor at a speed set by said setting means when a wow-flutter frequency of the motor rotating in the set speed coincides with or approximates a natural frequency.

16. A motor according to claim 15, wherein said prohibition circuit rotates the motor at a speed close to the set speed instead of the set speed.

* * * * *

UNITED STATES PATENT AND TRADEMARK OFFICE
CERTIFICATE OF CORRECTION

PATENT NO. : 5,157,300
DATED : October 20, 1992
INVENTOR(S) : Kataoka et al.

It is certified that error appears in the above-identified patent and that said Letters Patent is hereby corrected as shown below:

COLUMN 1

Line 64, "particularly" should read --particular,--.

COLUMN 2

Line 11, "driver" should read --driven--.
    Line 19, "like, is prevented" should read --like is prevented;--.

COLUMN 9

Line 34, "projection," should read --projections,--.

UNITED STATES PATENT AND TRADEMARK OFFICE
CERTIFICATE OF CORRECTION

PATENT NO. : 5,157,300

DATED : October 20, 1992

INVENTOR(S) : Kataoka et al.

It is certified that error appears in the above-identified patent and that said Letters Patent is hereby corrected as shown below:

COLUMN 10

Line 14, "phases" should read --phase--.
    Line 19, "wow-flatter," should read --wow-flutter,--.

Signed and Sealed this

Thirtieth Day of November, 1993

*Attest:*

BRUCE LEHMAN

*Attesting Officer*      *Commissioner of Patents and Trademarks*